US011345393B1

(12) United States Patent
Thornton

(10) Patent No.: US 11,345,393 B1
(45) Date of Patent: May 31, 2022

(54) DUAL BUSHING STEERING RACK

(71) Applicant: Super ATV, LLC, Madison, IN (US)

(72) Inventor: Ken Thornton, Canaan, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 17/643,222

(22) Filed: Dec. 8, 2021

(51) Int. Cl.
*B62D 3/12* (2006.01)

(52) U.S. Cl.
CPC .................... *B62D 3/12* (2013.01)

(58) Field of Classification Search
None
See application file for complete search history.

(56) References Cited

U.S. PATENT DOCUMENTS

| | | | | |
|---|---|---|---|---|
| 3,593,593 A | * | 7/1971 | Bradshaw | B62D 3/12 74/498 |
| 5,473,960 A | * | 12/1995 | Sakamoto | B62D 3/12 74/498 |
| 6,845,993 B2 | * | 1/2005 | Shirai | B62D 3/12 180/428 |
| 10,279,835 B2 | * | 5/2019 | Kawakubo | F16H 55/283 |
| 2019/0016368 A1 | * | 1/2019 | Djie | F16H 55/283 |
| 2020/0231201 A1 | * | 7/2020 | Hafermalz | B62D 5/0403 |
| 2021/0146989 A1 | * | 5/2021 | Span | B62D 3/126 |

FOREIGN PATENT DOCUMENTS

| | | | | |
|---|---|---|---|---|
| CN | 106641184 A | * | 5/2017 | B62D 3/12 |
| CN | 112298339 A | * | 2/2021 | |
| DE | 10225034 A1 | * | 12/2003 | B62D 3/126 |
| DE | 102006061501 A1 | * | 6/2008 | B62D 3/126 |
| WO | WO-2014202656 A1 | * | 12/2014 | B62D 3/12 |

* cited by examiner

*Primary Examiner* — Faye M Fleming
(74) *Attorney, Agent, or Firm* — Woodard, Emhardt, Henry, Reeves & Wagner, LLP

(57) ABSTRACT

A rack and pinion steering assembly includes: a pinion shaft driving a pinion gear; a steering rack having a toothed, engageable portion adapted to engage with the pinion gear, and a pressure-receiving portion opposite the engageable portion to apply a force on the steering rack to engage the steering rack with the pinion gear; a rack and pinion housing and associated steering tube; a first support bushing to support the steering rack in its housing on a first side of the assembly; and a second support bushing effective to support the steering rack on a second side of the assembly, with the second side of the assembly being opposite the first side of the assembly, relative to the pinion gear.

6 Claims, 6 Drawing Sheets

DUAL BUSHING STEERING RACK

FIELD OF THE INVENTION

The present invention relates generally to off-road vehicles, and more particularly to steering assemblies for off-road vehicles such as all-terrain (ATV) vehicles and utility task (UTV) vehicles.

BACKGROUND TO THE INVENTION

Rack and pinion steering systems use a pinion (a circular gear) and a rack (a linear gear) to convert the rotational motion of a steering wheel into linear motion that turns the wheels. While rack and pinion steering is popular with many light-weight vehicles, in the operating conditions encountered by high-performance off-road use the assembly may fail. More particularly, with prior art assemblies there is limited support along the Y axis, and the loads in the Z axis are either taken by the gear or the spring loaded (gear pre-load) support, both of which reduce the rack's life.

A need therefore exists for a steering assembly for high-performance off-road vehicles that supports the assembly more robustly. The present invention address that need.

SUMMARY OF THE INVENTION

In one preferred aspect of the present invention there is provided a rack and pinion steering assembly for an off-road vehicle. The assembly preferably, comprises:
 a) a pinion assembly comprising a pinion shaft driving a pinion gear, and defining a central portion that divides the rack and pinion steering assembly into a first side and a second side relative to the central portion;
 b) a steering rack having a toothed, engageable portion adapted to engage with the pinion gear, and a pressure-receiving portion opposite the engageable portion;
 c) a pressure-applying assembly adapted to apply a force on the steering rack effective to engage the steering rack with the pinion gear, the pressure-applying assembly comprising a cup and a spring;
 d) a rack and pinion housing and an associated steering tube for housing steering rack and the pinion assembly;
 e) a first support bushing effective to support the steering rack in housing on a first side of the rack and pinion steering assembly;
 f) a second support bushing effective to support the steering rack in steering tube on a second side of the rack and pinion steering assembly, wherein the second side of the rack and pinion steering assembly is opposite the first side of the rack and pinion steering assembly relative to the pinion assembly.

WRITTEN DESCRIPTION

Figure 1:
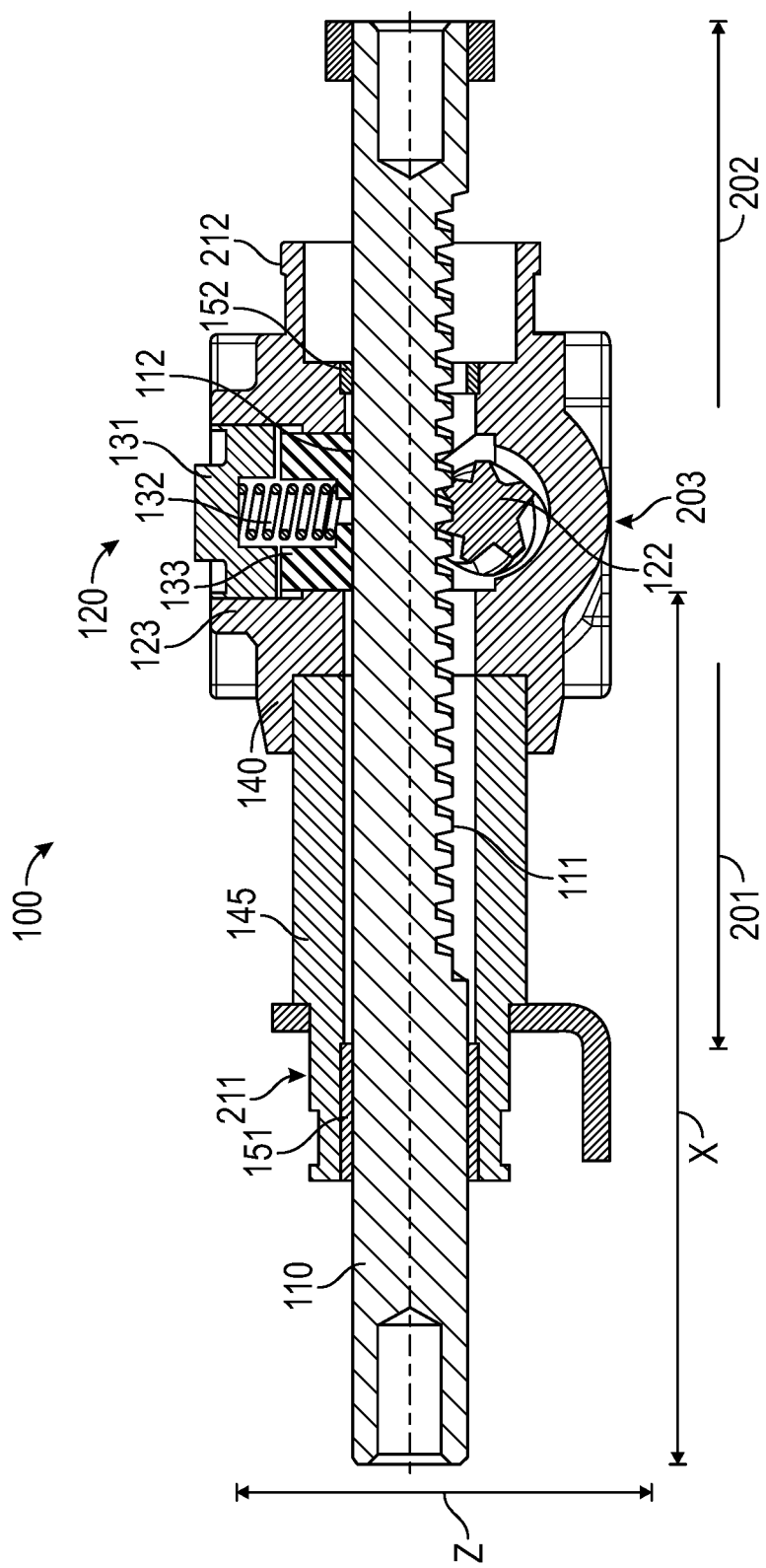
FIG. 1 shows a sectional view of one embodiment of the present invention, in the X-Z plane.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to a rack and pinion steering assembly for an off-road vehicle. The assembly preferably, comprises:
 a) a pinion assembly comprising a pinion shaft driving a pinion gear, and defining a central portion that divides the rack and pinion steering assembly into a first side and a second side relative to the central portion;
 b) a steering rack having a toothed, engageable portion adapted to engage with the pinion gear, and also having a pressure-receiving portion opposite the engageable portion;
 c) a pressure-applying assembly adapted to apply a force on the steering rack effective to engage the steering rack with the pinion gear;
 d) a rack and pinion housing and an associated steering tube for housing the pinion assembly and the steering rack;
 e) a first support bushing effective to support the steering rack on the first side of the rack and pinion steering assembly;
 f) a second support bushing effective to support the steering rack on the second side of the rack and pinion steering assembly, wherein the second side of the rack and pinion steering assembly is opposite the first side of the rack and pinion steering assembly relative to the pinion assembly.

The assembly housing preferably has openings on three sides. Two of those sides are arranged longitudinally along the line of travel for the steering rack, and provide openings for the steering rack (or associated connection components) to pass though. One of those two sides preferably includes a steering rack tube extending therefrom, and the other of those two sides in generally open. Tie rods or other connection components connect to the two ends of the steering rack, and control the movement of the wheels.

The third side (which may be perpendicular to the other two open sides) has an opening that provides an entry for the steering shaft that is connected to the steering column.

The steering shaft rotates with the steering wheel, to provide directional control to the vehicle, as is known to the art. Thus, as the steering wheel rotates, the steering shaft/ inion shaft similarly rotate, thus driving the pinion gear. As the pinion gear turns, the rotational movement of the pinion gear is translated to a linear movement of the steering rack gear. The linear movement of the steering rack moves the wheel left or right.

The pinion gear is maintained in engagement with the steering rack by a pressure-applying assembly. In one embodiment, the pressure-applying assembly comprises an upper cap, a lower cup or bushing, and a spring therebetween. The spring is held in a compressed position between the cap and the cup/bushing, and therefore applies pressure to the pinion gear to maintain effective engagement between the pinion gear and the steering rack/gear. Accordingly, one preferred pressure-applying assembly comprises a coil spring compressed to exert a force on the pinion gear through a bushing, which may be formed as a cup.

With the forgoing assembly, the steering rack is thus supported within the pinion housing where the rack contacts the pinion gear. In addition to that support, a first bushing may be used on one side of the pinion assembly to support the steering rack on that side of the pinion assembly. With the present invention, a second bushing is provided on the other side of the pinion assembly (preferably within the pinion housing) to support the steering rack on the other side of the pinion assembly. This gives complete support to the steering rack along its axis of movement, and gives additional support to increase the life of the spring-loaded support, which in turn keeps the gear preload within specification and increases gear lift.

The second support bushing provided by the present invention may be positioned in the driver's side opening of the pinion assembly housing. In one embodiment the second support bushing is a circular ring, with a round inside shape. In another embodiment, either or both of the support bushings may have a non-round inside shape, such as a "D" shape that generally matches the shape of the steering rack where the rack is supported by the bushing.

Either or both of the support bushings, including the second support bushing provided by the present invention, may be made of a low-friction material, such as polytetrafluoroethylene (PTFE) or nylon.

Referring now to the drawings, FIG. 1 shows a sectional view of a rack and pinion steering assembly 100 for an off-road vehicle, in the X-Z plane, according to one preferred embodiment. The illustrated assembly comprises:
 a) a pinion assembly 120 comprising a pinion shaft driving a pinion gear 122, and defining a central portion 203 that divides the rack and pinion steering assembly into a first side 201 and a second side 202 relative to the central portion;
 b) a steering rack 110 having a toothed, engageable portion 111 adapted to engage with the pinion gear, and a pressure-receiving portion 112 opposite the engageable portion;
 c) a pressure-applying assembly adapted to apply a force on the steering rack effective to engage the steering rack with the pinion gear, the pressure-applying assembly comprising a spring 132 between a cap 131 and a cup 133;
 d) a rack and pinion housing 140 and an associated steering tube 145 for housing steering rack 110 and the pinion assembly 120;
 e) a first support bushing 151 effective to support the steering rack on a first side of the rack and pinion steering assembly;
 f) a second support bushing 152 effective to support the steering rack on a second side of the rack and pinion steering assembly, wherein the second side of the rack and pinion steering assembly is opposite the first side of the rack and pinion steering assembly relative to the pinion assembly.

The passenger side portion 211 of the assembly preferably extends in the first direction 201, and the driver's side portion 212 of the assembly preferably extends in the second direction 202.

Figure 2:
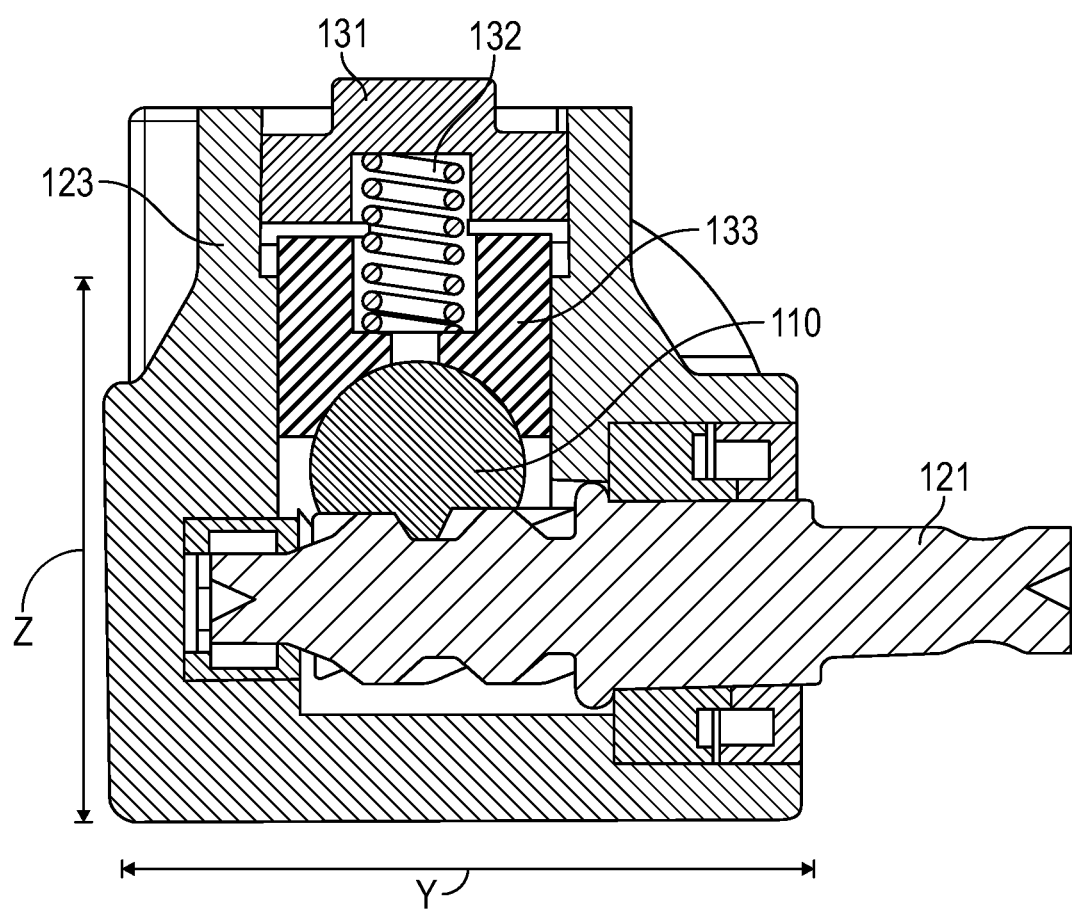
FIG. 2 shows a section view of one embodiment of the present invention, in the Y-Z plane.

FIG. 2 shows a section view of the rack and pinion gear interaction, in the Y-Z plane, according to one preferred embodiment. With prior art assemblies, there is limited support along the Y axis, and the loads in the Z axis are either taken by the gear or the spring loaded (gear pre-load) support, both of which reduce the rack's life. The present invention gives complete support to the Y axis, and gives additional support to increase the life of the spring-loaded support, which in turn keeps the gear preload within specification and increases gear lift.

Figure 3:
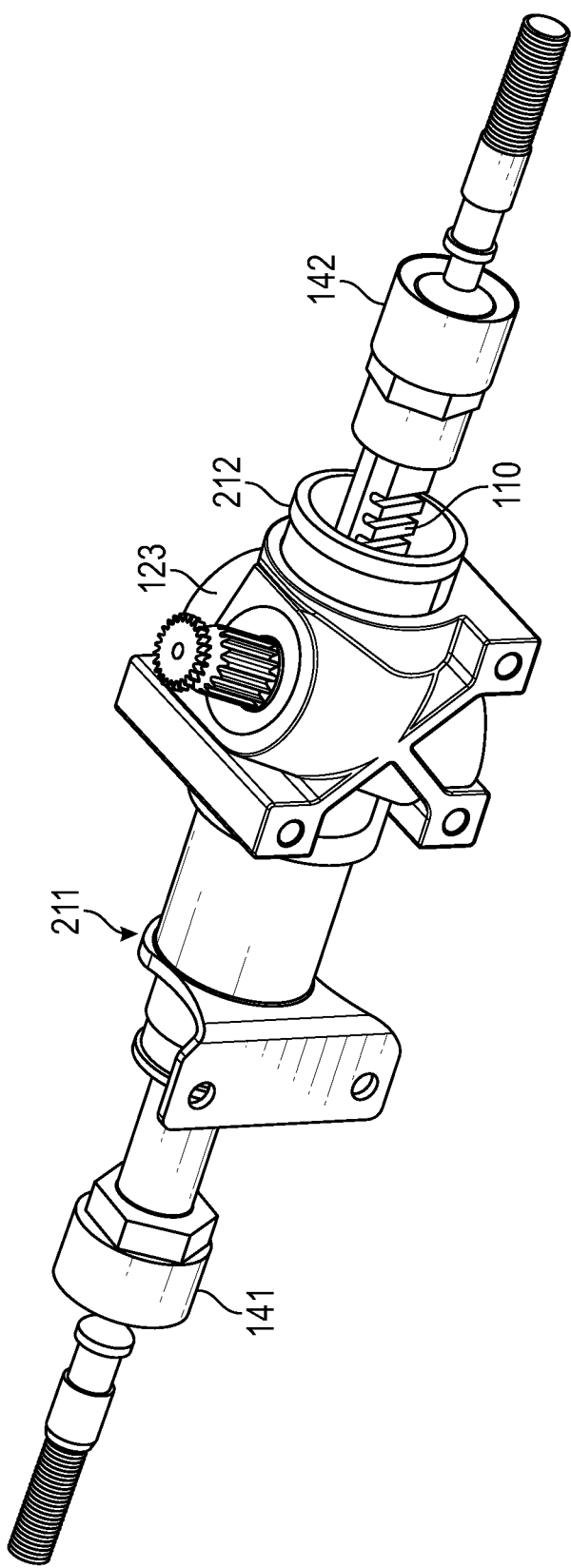
FIG. 3 shows a perspective view of a rack and pinion assembly.
Figure 4:
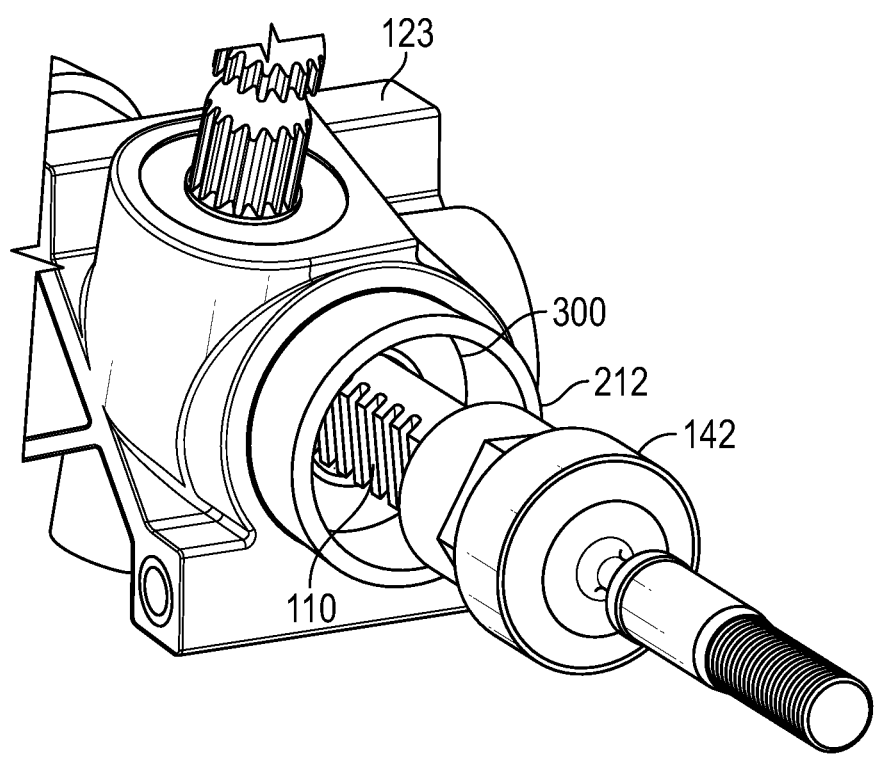
FIG. 4 shows another perspective view of a rack and pinion assembly.

FIG. 3 shows a perspective view of a rack and pinion assembly. The central portion 123 of the assembly separates the steering rack 110 into a driver's side portion 211 and a passenger's side portion 212. Steering rack 110 extends out from the driver's side end 212 of the assembly and terminates in knuckle 142 that connects the steering rack to a first tie rod. Steering rack 110 also extends out from the passenger's side end 211 of the assembly and terminates in knuckle 141 that connects the steering rack to a second tie rod FIG. 4 shows another perspective view of a rack and pinion assembly. Steering rack 110 exits housing 123 at driver's side opening 300, into which the inventive second support bushing may be inserted.

Figure 5:
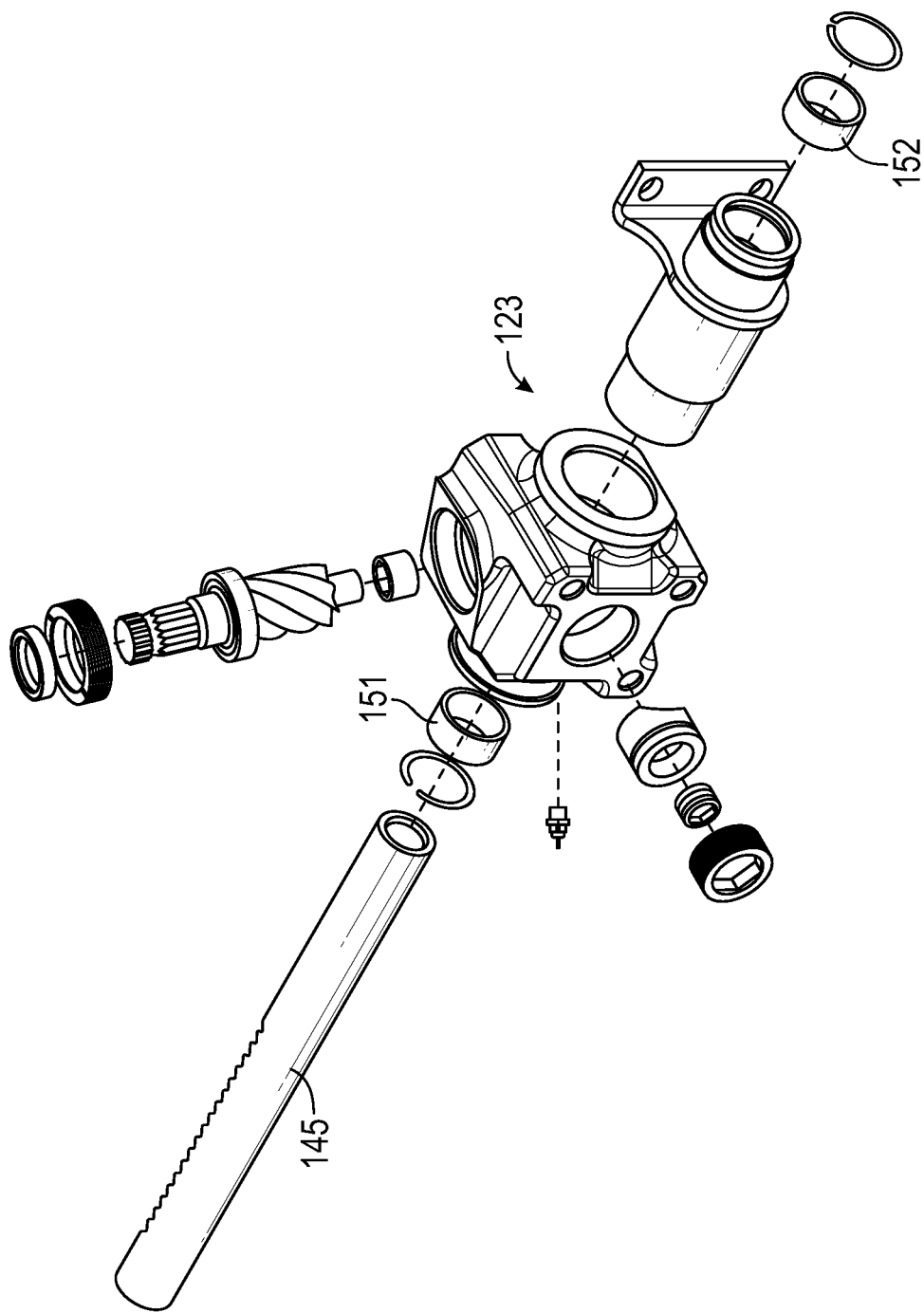
FIG. 5 shows an exploded view of one embodiment of the present invention.

FIG. 5 shows an exploded view of one embodiment of the present invention. First bushing 151 is installed on a first side of the pinion assembly, and second bushing 152 is installed on the opposite side of the pinion assembly. Steering tube 145 extends from housing 123.

Figure 6:
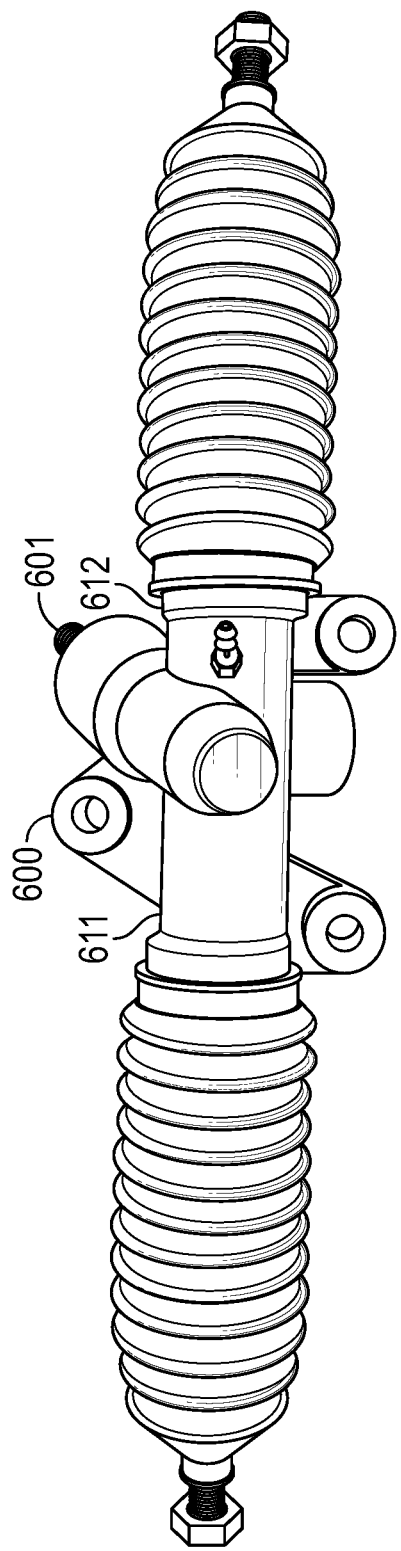
FIG. 6 shows another perspective view of a rack and pinion assembly.
Figure 7:
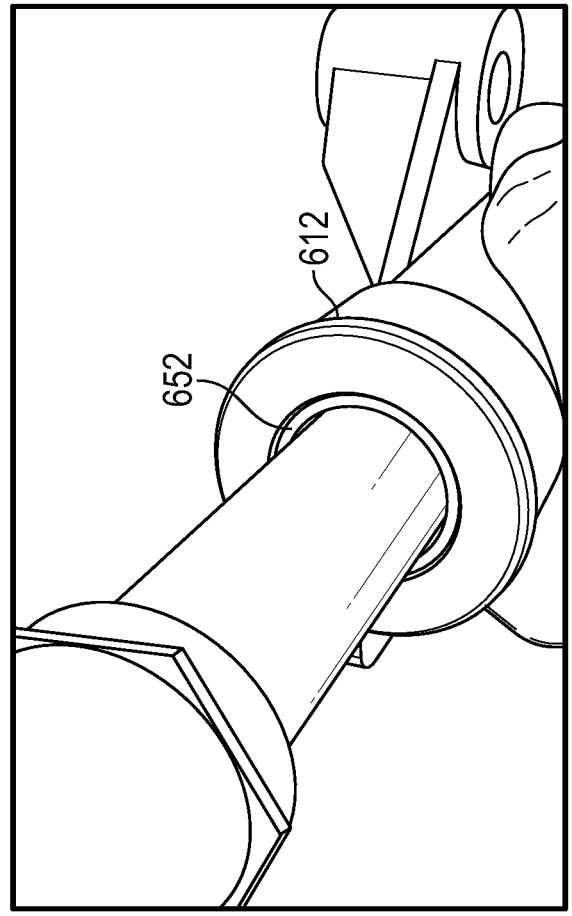
FIG. 7 shows another view of one embodiment of the present invention.

FIGS. 6 and 7 show another perspective view of a rack and pinion assembly. Assembly 600 comprises:
 a) a pinion assembly comprising a pinion shaft 601 driving a pinion gear, and defining a central portion 610 that divides the rack and pinion steering assembly into a first side 611 and a second side 612 relative to the central portion;
 b) a steering rack having a toothed, engageable portion adapted to engage with the pinion gear, and a pressure-receiving portion opposite the engageable portion;
 c) a pressure-applying assembly adapted to apply a force on the steering rack effective to engage the steering rack with the pinion gear, the pressure-applying assembly comprising a cup and a spring;
 d) a rack and pinion housing and an associated steering tube for housing steering rack and the pinion assembly;
 e) a first support bushing 651 effective to support the steering rack in housing on a first side of the rack and pinion steering assembly; and
 f) a second support bushing 652 effective to support the steering rack in steering tube on a second side of the rack and pinion steering assembly, wherein the second side of the rack and pinion steering assembly is opposite the first side of the rack and pinion steering assembly relative to the pinion assembly.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A rack and pinion steering assembly for an off-road vehicle, comprising:
   a) a pinion assembly comprising a pinion shaft driving a pinion gear, and defining a central portion that divides the rack and pinion steering assembly into a first side and a second side relative to the central portion;
   b) a steering rack having a toothed, engageable portion adapted to engage with the pinion gear, and a pressure-receiving portion opposite the engageable portion;
   c) a pressure-applying assembly having an upper cap and a lower bushing, and a spring therebetween adapted to apply a force on the steering rack effective to engage the steering rack with the pinion gear;
   d) a rack and pinion housing for housing steering rack and the pinion assembly;
   e) a first support bushing effective to support the steering rack in housing on the first side of the rack and pinion steering assembly;
   f) a second support bushing effective to support the steering rack on the second side of the rack and pinion steering assembly, wherein the second side of the rack and pinion steering assembly is opposite the first side of the rack and pinion steering assembly relative to the pinion assembly.

2. The assembly of claim 1 wherein the first side of the rack and pinion steering assembly is the passenger's side, and the second side of the rack and pinion steering assembly is the driver's side.

3. The assembly of claim 1 wherein the a coil spring compressed to exert a force on the pinion gear through bushing or a cup.

4. The assembly of claim 1 wherein the second support bushing is positioned in the driver's side opening of the pinion assembly housing.

5. The assembly of claim 1 wherein the second support bushing is made of a low-friction material.

6. The assembly of claim 1 wherein the second support bushing is made of polytetrafluoroethylene (PTFE).

* * * * *